US006530519B1

(12) United States Patent
Suzuki

(10) Patent No.: US 6,530,519 B1
(45) Date of Patent: Mar. 11, 2003

(54) IMAGE RECORDING APPARATUS

(75) Inventor: Masao Suzuki, Amimachi (JP)

(73) Assignee: Riso Kagaku Corporation, Tokyo (JP)

(*) Notice: Subject to any disclaimer, the term of this patent is extended or adjusted under 35 U.S.C. 154(b) by 174 days.

(21) Appl. No.: 09/612,101

(22) Filed: Jul. 7, 2000

(30) Foreign Application Priority Data

Jul. 7, 1999 (JP) .......................................... 11-193211

(51) Int. Cl.[7] ................................................ G06F 17/00
(52) U.S. Cl. ....................................................... 235/375
(58) Field of Search ............................ 235/375; 347/7; 355/206; 346/76 PH; 400/249

(56) References Cited

U.S. PATENT DOCUMENTS

| | | | | |
|---|---|---|---|---|
| 5,021,828 A | | 6/1991 | Yamaguchi et al. | |
| 5,220,352 A | * | 6/1993 | Yamamoto et al. | 346/17 |
| 5,365,312 A | | 11/1994 | Hillmann et al. | |
| 5,481,100 A | | 1/1996 | Terauchi | |
| 5,610,635 A | * | 3/1997 | Murray et al. | 347/19 |
| 5,755,519 A | * | 5/1998 | Klinefelter | 400/208 |
| 5,930,553 A | * | 7/1999 | Hirst et al. | 399/12 |
| 6,345,532 B1 | * | 2/2002 | Coudray et al. | 347/7 |

FOREIGN PATENT DOCUMENTS

| | | |
|---|---|---|
| EP | 0 395 320 | 10/1990 |
| EP | 0 720 916 A2 | 7/1996 |
| EP | 0 789 322 | 8/1997 |
| EP | 0 854 043 | 7/1998 |
| EP | 0 873 873 A2 | 10/1998 |
| EP | 0 878 307 | 11/1998 |
| EP | 0 891 865 A2 | 1/1999 |
| JP | 5-193127 | 8/1993 |
| JP | 5-290227 | 11/1993 |
| JP | 2571259 | 2/1998 |
| WO | WO 98/04414 | 2/1998 |

OTHER PUBLICATIONS

JP 09–120345, Patent Abstracts of Japan, May 6, 1997.
JP 11–348317, Patent Abstracts of Japan, Dec. 21, 1999.
European Search Report, Jun. 12, 2001.

* cited by examiner

*Primary Examiner*—Karl D. Frech
*Assistant Examiner*—Lisa M. Caputo
(74) *Attorney, Agent, or Firm*—Nixon Peabody LLP; Donald R. Studebaker

(57) ABSTRACT

An image recording apparatus includes a main body provided with a control unit and a consumable which is mounted on the main body to be replaceable and forms a component of the image recording apparatus. The consumable is provided with an information memory in which electronic data representing information on the consumable is stored, and the control unit of the main body is provided with a data communication system which is operatively connected to the information memory when the consumable is mounted on the main body and transfers electronic data between the main body and the consumable.

11 Claims, 3 Drawing Sheets

IMAGE RECORDING APPARATUS

BACKGROUND OF THE INVENTION

1. Field of the Invention

This invention relates to an image recording apparatus such as a stencil printer including a consumable as a component for achieving its function, and more particularly to such an image recording apparatus in which the consumable is replaceable.

2. Description of the Related Art

For example, in a stencil printer, consumables such as an ink cartridge, a master roll (a roll of a stencil master material) and the like are mounted on the main body to be replaceable. The ink, the stencil master material and the like are properly supplied from the ink cartridge, the master roll and the like in place and function as components of the image recording apparatus. When such consumables are exhausted, they are replaced with new ones and the image recording apparatus can keep its function.

In order to keep the function of the image recording apparatus, it is required that the function of the consumables conforms to the function of the main body.

When the combination of the main body and a consumable is improper, the image recording apparatus cannot work properly and failure of the main body and/or the consumable can be caused. Accordingly, when a consumable is mounted on the main body, it is necessary to determine whether the consumable is applicable to the main body and to inform the operator of the decision by a message or the like.

There have been known various systems for preventing wrong use of a consumable in a stencil printer.

For example, the shape of the ink cartridge and/or the diameter of the paper core of the master roll are changed according to the model of stencil printer (will be referred to as "the mechanical prevention system", hereinbelow). See registered Japanese Utility Model No. 2571259. As an electric prevention system, there has been known a system in which a plurality of detectors such as switches are provided to be selectively operated when a consumable provided with an actuator which is differently shaped according to the model of the consumable is mounted on the main body and whether the consumable is applicable to the main body is determined by the combination of the detectors operated by the actuator. Further, as disclosed, for instance, in Japanese Unexamined Patent Publication No. 5(1993)-290227, there has been known a bar code type prevention system in which a different bar code is attached to a consumable according to the model of the consumable while the main body is provided with a bar code reader which reads the bar code on the mounted consumable and determines whether the consumable is applicable to the main body on the basis of the bar code.

However, the mechanical prevention system is disadvantageous in that standardization of consumables cannot be achieved when a wide variety of printers are developed, many different molds are required, additional manhours are required for changing the facilities (jigs) in the manufacturing line, and management of supply of consumables for responsibility of keeping supply of consumables becomes complicated. The electric prevention system is disadvantageous in that the number of varieties of the printers to be developed is limited since the consumable is identified on the basis of the combination of the detectors operated by the actuator and problems similar to those inherent to the mechanical prevention system arise with respect to the shape, the color and the like of the actuator. Further, the bar code type prevention system is disadvantageous in that an expensive bar code reader is required in order to read the bar code at a high accuracy and there is fear of misreading due to stain or the like of the bar code.

Further, when a consumable is replaced, the matching conditions (matching parameters) for matching the consumable with the main body sometimes must be changed, and conventionally, a serviceman or an operator manually adjusts the parameters according to the combination of the main body and the consumable so that the performance of the stencil printer is maximized.

For example, in a stencil printer, when the master roll is changed and the sensitivity to perforation of the stencil master material varies, it is necessary to change energy setting of the stencil master making unit. When the thickness of the stencil master material is changed, it becomes necessary to change setting of the master discharge volume and/or the sensitivities of various master sensors. When the ink cartridge is changed and the viscosity (color) of the ink changes, it becomes necessary to change setting of the printing pressure, setting of the pumping speed, setting of the idle time and setting of the ink quantity sensor.

However, in the case where the matching conditions are manually changed, management and adjustment of the matching conditions must be carried out for each of the models of the printers, which is very troublesome, and when the specifications of the main body and the consumable are both changed, resetting or adjustment of the matching parameters becomes difficult.

Further, it is necessary to display remainder of the consumable so that the operator can know the time at which the consumable is to be replaced. For this purpose, conventionally, detecting means for detecting remainder or consumption of the consumables such as those formed of sensors and/or mechanisms are provided and values detected by the detecting means are displayed on a panel.

However provision of such detecting means adds to the cost and if simplified mechanisms are used, it is difficult to detect at a high accuracy.

SUMMARY OF THE INVENTION

In view of the foregoing observations and description, the primary object of the present invention is to provide an image recording apparatus in which prevention of use of an inapplicable consumable, change of setting the matching conditions when a consumable is replaced with a consumable of different properties, display of remainder of a consumable and/or the like can be surely and easily performed.

In accordance with the present invention, there is provided an image recording apparatus comprising a main body provided with a control unit and a consumable which is mounted on the main body to be replaceable and forms a component of the image recording apparatus, wherein the improvement comprises that

- the consumable is provided with an information memory means in which electronic data representing information on the consumable is stored, and
- the control unit of the main body is provided with a data transfer means which is operatively connected to the information memory means when the consumable is mounted on the main body and transfers the electronic data between the main body and the consumable.

The connection between the data transfer means and the data memory means may be established either in contact or non-contact. For example, the connection may be an electric connection, a magnetic connection or by way of radio waves.

It is preferred that the information memory means comprises a nonvolatile memory which holds recorded data for a certain period without supply of power.

It is preferred that the consumable be supplied with the electronic data (representing information on the consumable) recorded in the information memory means in advance, for instance, before the consumable is shipped from the factory.

It is further preferred that the electronic data be collated with corresponding data set in the control unit of the main body when the consumable is mounted on the main body. In this case, it is preferred from the viewpoint of preventing wrong use of the consumable, which can result in unsatisfactory operation and/or failure of the image recording apparatus, that when it is determined that the consumable mounted on the main body is inapplicable as the result of the collation, the control unit stops the image recording apparatus and informs the operator of the fact by a message or the like. Further it is preferred from the viewpoint of preventing deterioration of the performance of the image recording apparatus due to change with time of the consumable that the electronic data includes information on the date of production of the consumable while the control unit of the main body is provided with a timer, and when it is determined, by comparison of the information on the date of production and the time given by the timer, that the consumable mounted on the main body has aged longer than a predetermined period, the control unit stops the image recording apparatus and informs the operator of the fact by a message or the like.

Further it is preferred that the control unit of the main body automatically controls adjusters of the main body on the basis of the matching parameters for the consumable represented by the electronic data.

Further it is preferred that the control unit of the main body be able to write information in the information memory means through the data transfer means.

Further it is preferred that the electronic data stored in the information memory means includes information on the total volume of the consumable, and the control unit calculates consumption of the consumable and manages remainder of the consumable on the basis of the calculated consumption of the consumable. It is possible to arrange the control unit to calculate consumption of the consumable, to record the calculated consumption of the consumable in the information memory means and to manage remainder of the consumable on the basis of the stored consumption of the consumable.

In this case, it is preferred that the control unit displays the remainder of the consumable on a display such as a panel. It is further preferred that the control unit determines on the basis of the remainder of the consumable whether there remains a sufficient amount of the consumable to accomplish the operation intended by the operator, and informs, when it is determined that the remainder is too small to accomplish the operation, the operator of the fact by a message. It is further preferred that the control unit detects that the remainder of the consumable is almost exhausted on the basis of the value of the remainder of the same managed by the control unit, and informs the operator of the fact that the consumable is to be replaced.

It is further preferred that the control unit does not operate the main body when the remainder of the consumable as recorded in the information memory means is nullified.

It is further preferred that protective information be recorded in the information memory means of the consumable and the control unit of the main body, the protective information in the information memory means and the protective information in the control unit be collated with each other when the consumable is mounted on the main body, and when the protective information in the information memory means and the protective information in the control unit conflict with each other, the control unit does not operate the main body. In this case, it is further preferred that the control unit be provided with a setting means for resetting the set protective information or setting the protective information. Further it is preferred that the protective information recorded in the control unit can be rewritten so that the protective information can be changed. Similarly, it is preferred that the protective information recorded in the information memory means can be reset through the data transfer means. When the information recorded on the control unit and/or the information memory means is to be reset, it is preferred that security is provided, for instance, by use of a password.

When the container of the consumable is reused and refilled, it is preferred that the number of times by which the container has been refilled be recorded in the information memory means and the number of times by which the container is reused be managed.

It is possible to removably attach an electronic device including the information memory means to the consumable and reuse the electronic device. In this case, it is preferred that the number of times by which the electronic device has been reused be recorded in the information memory means and the number of times by which the electronic device is reused be managed.

From the viewpoint of preventing forgery or imitation it is preferred that the information recorded in the information memory means or the control unit be coded.

In the case where a plurality of consumables are mounted on the main body, it is preferred that the control unit of the main body accesses the information memory means of the respective consumables in a time sharing system. With this arrangement, the control unit can be simple in structure.

In the image recording apparatus in accordance with the present invention, by recording information on applicable models of apparatuses in the information memory means of the consumable, the control unit can accurately judge whether the consumable mounted on the main body is applicable to the main body and can surely prevent an inapplicable consumable from being used, whereby failure of the apparatus due to use of an inapplicable consumable can be surely avoided.

Further when the matching parameters between the main body and the consumable are recorded in the information memory means, adjustment of the systems can be automatically effected on the basis of the recorded matching parameters without troubling the operator, whereby the apparatus can properly operate even if the properties of the consumable vary.

Further, when the electronic data stored in the information memory means includes information on the total volume of the consumable and the control unit calculates consumption of the consumable and manages remainder of the consumable on the basis of the calculated consumption of the consumable, the consumable can be replaced at proper time without providing a sensor for detecting the remainder of the consumable, whereby the working efficiency of the apparatus can be improved. In this case, when the control unit of the main body can record information in the information memory means of the consumable, management of the remainder of the consumable can be held continuous even if the consumable is once removed from the main body.

In the case where protective information is recorded in the information memory means of the consumable and the control unit of the main body and the protective information in the information memory means and the protective information in the control unit are collated with each other when the consumable is mounted on the main body, the consumable can be used under conditions proper to use and/or management of the apparatus, whereby flexibility is added.

DESCRIPTION OF THE PREFERRED EMBODIMENT

Figure 1:
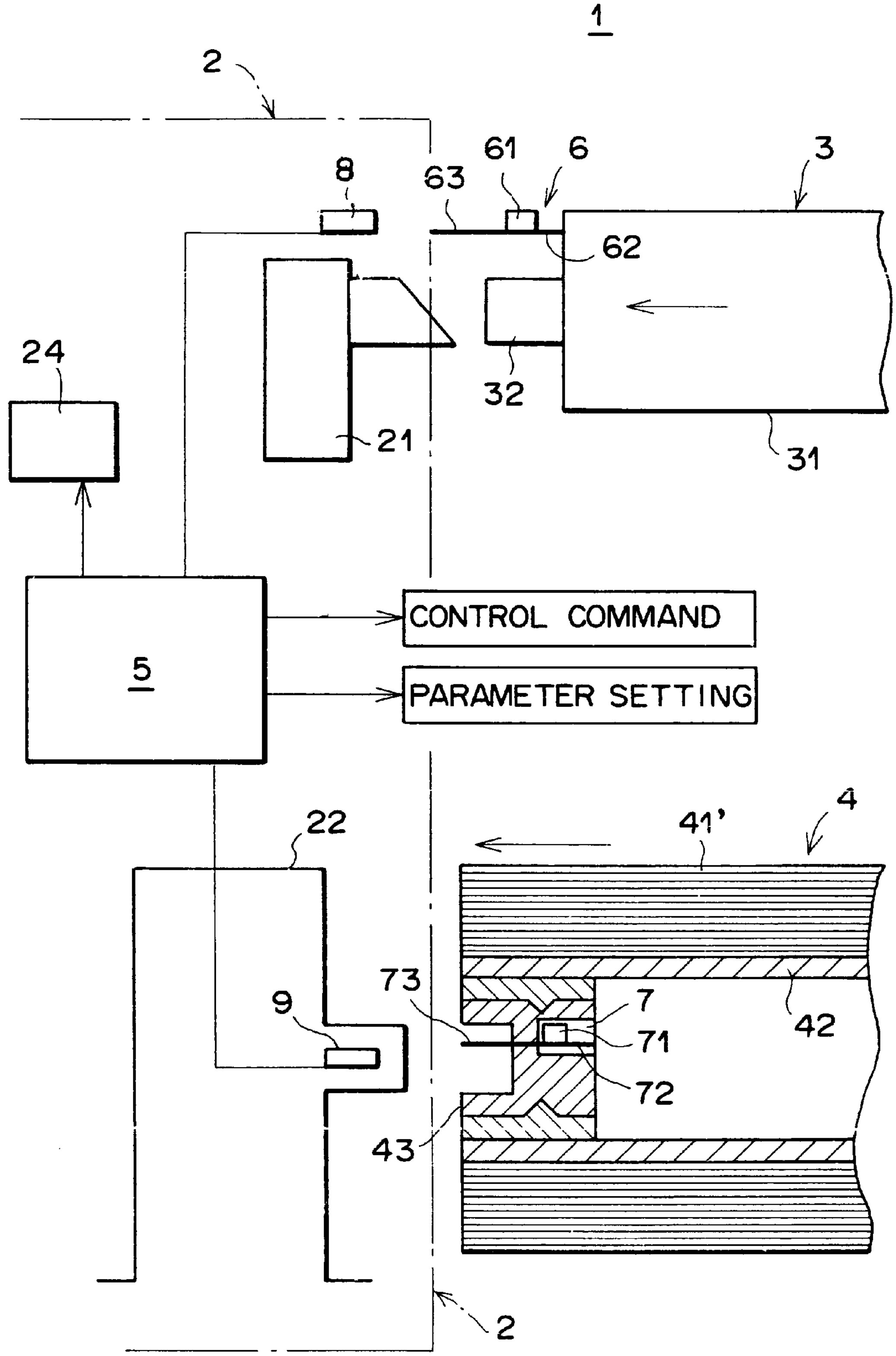
FIG. 1 is a schematic view for illustrating a stencil printer in accordance with an embodiment of the present invention.
Figure 2:
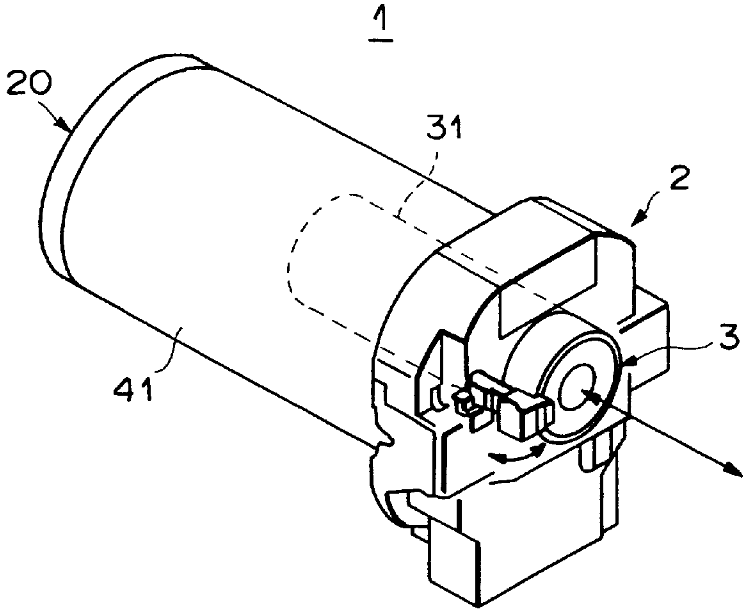
FIG. 2 is a schematic perspective view showing mounting of the ink cartridge employed in the stencil printer.
Figure 3:
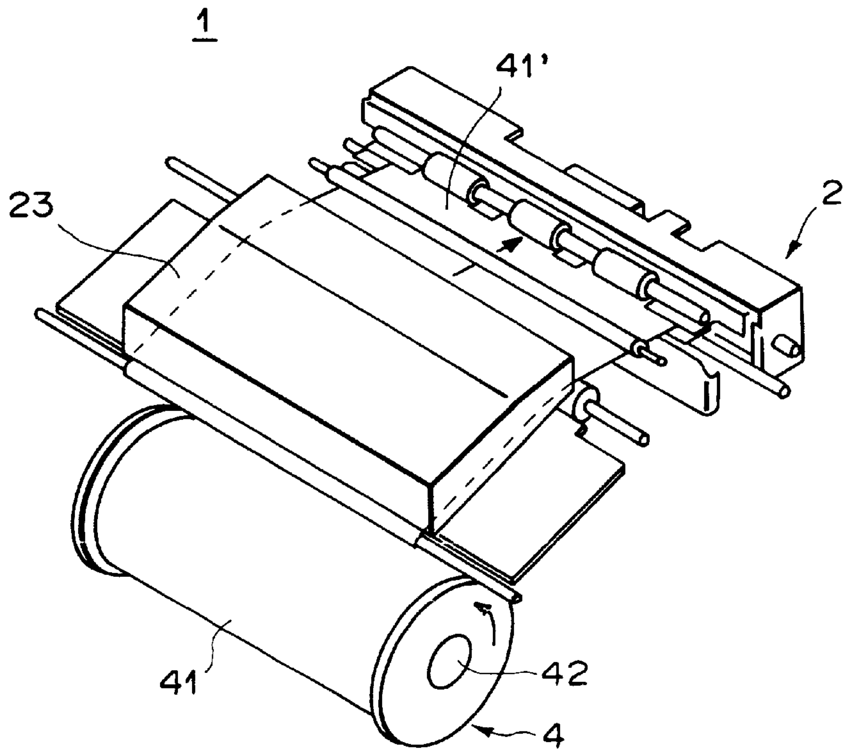
FIG. 3 is a schematic perspective view showing mounting of the master roll.

In FIGS. 1 to 3, a stencil printer 1 in accordance with an embodiment of the present invention comprises a main body 2 including a printing drum 20 around which a stencil master 41 is wound. An ink cartridge (ink bottle) 3 is inserted into the printing drum 20 from one end of the printing drum 20 in one direction and mounted thereon. As indicated by the double-headed arrow in FIG. 2, the ink cartridge 3 can be removed from the printing drum 20 by pulling it in the reverse direction, that is, the ink cartridge 3 is replaceable. The ink cartridge 3 comprises a container 31 filled with ink. When the ink cartridge 3 is inserted into the printing drum 20, an ink supply portion 32 on the leading end of the container 31 is connected to an ink feed pump 21 in the printing drum 20 and the ink in the container 31 is used in printing. When the ink in the container 31 is exhausted, the ink cartridge 3 is removed from the printing drum 20 and is replaced with new one. The ink cartridge 3 will be sometimes referred to as "the first consumable 3", hereinbelow.

The stencil master 41 to be wound around the printing drum 20 is made of a stencil master material 41' in a continuous length. That is, a master roll 4 comprising a stencil master material 41' in a continuous length wound around a paper core 42 is mounted on a master holder 22 (FIG. 1) of the main body 2 to be replaceable. The master roll 4 will be sometimes referred to as "the second consumable", hereinbelow. The stencil master material 41' is unrolled from the master roll 4 and is imagewise perforated by a stencil master making unit (TPH:thermal perforating head) 23 (FIG. 3). Then the perforated stencil master material 41' is cut in a predetermined length and the stencil master 41 is made, and the stencil master 41 is wound around the printing drum 20.

The main body 2 is further provided with a control unit 5 as shown in FIG. 1. The control unit 5 controls various functional components, sets matching parameters for various parts, and displays messages on a display panel 24.

The first consumable or the ink cartridge 3 is provided at a part (the leading end) of the container 31 with a first memory means 6 which stores information in the form of electronic data. The first memory means 6 comprises a memory IC 61, which is a nonvolatile memory (e.g., EEPROM) which holds recorded data for a certain period without supply of power. The memory IC 61 is mounted on a base 62 fixed to the container 31 of the ink cartridge 3, and a first contact 63 is provided on the leading end portion of the base 62. Similarly, a second memory means 7 is provided in the paper core 42 of the master roll 4 (the second consumable). The second memory means 7 comprises a support 43 which is mounted in the paper core 42 to be rotatable relative to the paper core 42 and a memory IC 71 supported by the support 43 by way of a base 72. The memory IC 71 is also a nonvolatile memory. A second contact 73 is provided on the leading end portion of the base 72.

On the side of the main body 2, a first connector 8 is disposed near the ink feed pump 21 to be brought into electrical contact with the first contact 63 as a data transfer means to be connected to the first memory means 6 of the first consumable or the ink cartridge 3, and a second connector 9 is disposed in the master holder 22 to be brought into electrical contact with the second contact 73 as a data transfer means to be connected to the second memory means 7 of the second consumable or the master roll 4.

The first and second connectors 8 and 9 are connected to the control unit 5 and the memory Ics 61 and 71 of the first second consumables 3 and 4 are connected to the control unit 5 by way of the first and second connectors 8 and 9 when the first and second consumables 3 and 4 are mounted on the main body 2, whereby the control unit 5 can freely access the memory Ics 61 and 71. The control unit 5 can record data in the memory Ics 61 and 71 by way of the first and second connectors 8 and 9.

Consumable information such as information on applicable models of printers, information on setting of matching parameters (e.g., information on sensitivity of the stencil master material, information on thickness of the stencil master material, information on viscosity of the ink, information on color of the ink, information on dielectric constant of the ink, and information on the time for which the ink has been left at rest), information on the date of production of the consumable, and information on the total volume of the consumable is recorded in the memory means is recorded in the first and/or second memory means 6 and 7.

When the first and second consumables 3 and 4 are mounted in place on the main body 2, the control unit 5 reads the contents of the first and second memory means 6 and 7 which are attached to the consumables 3 and 4 in the factory and in which necessary information is recorded in the factory and collates the information with data recorded in a memory means built in the control unit 5. Then, on the basis of the result of the collation, the control unit 5 performs the protecting function for preventing use of an inapplicable consumable and, at the same time, automatically adjusts the matching parameters for desired functions of the stencil printer 1 to be described later so that the functions are optimized provided that the functions can be made satisfactory by adjusting the matching parameters. When there is fear that the consumables 3 and 4 can cause failure no matter how the matching parameters are adjusted, the control unit 5 only provides a message to the effect that the mounted consumable is inapplicable on the display panel 24. Further, the control unit 5 may perform management of remainder of the consumables and/or various protecting functions as will be described later. The control unit 5 is provided with a setting means (not shown) for setting and resetting the information and various working conditions recorded in the memory means 6 and 7 and the built-in memory of the control unit 5. The setting means may be disposed for instance in the display panel 24. The control unit 5 accesses the first and second memory means 6 and 7 in a time sharing system.

Figure 4:
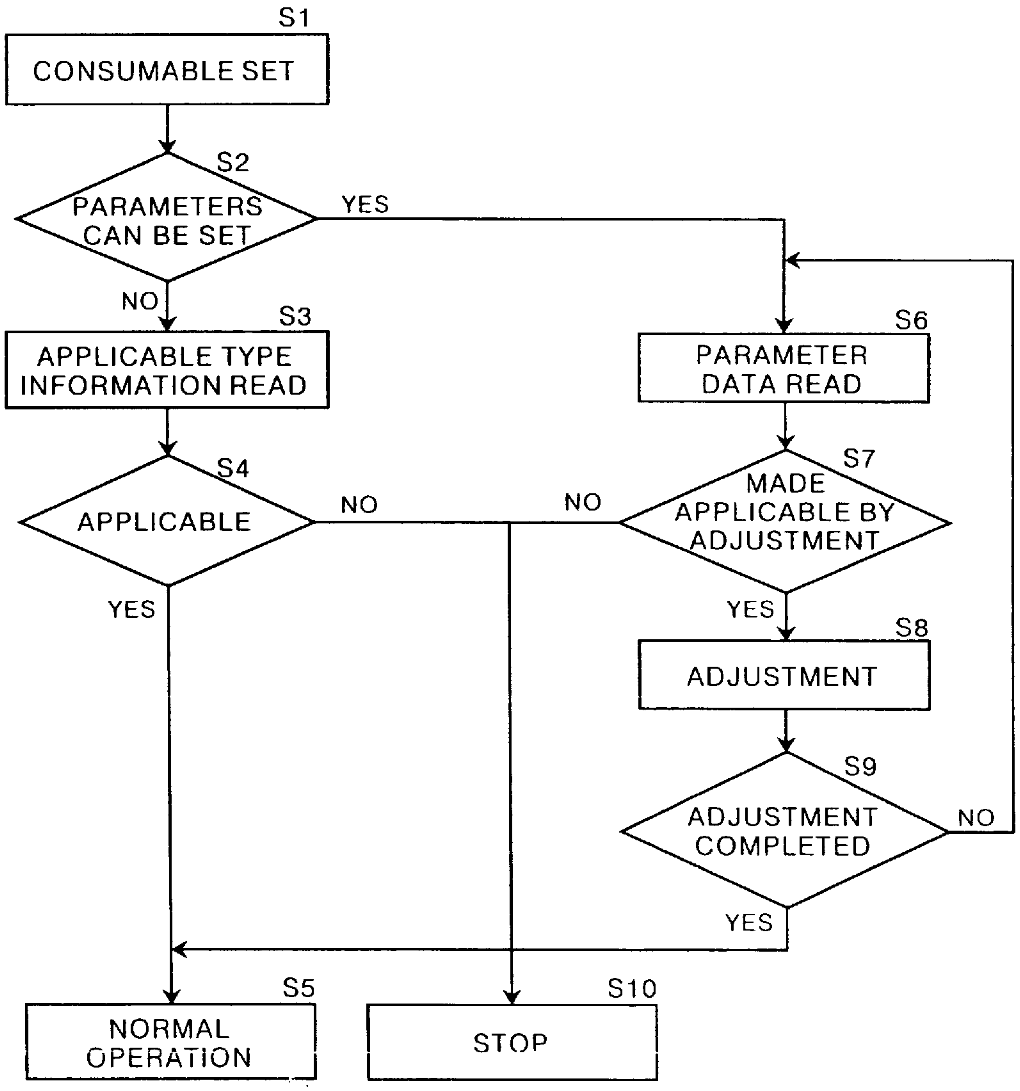
FIG. 4 is a flow chart for illustrating the flow of control in the stencil printer.

FIG. 4 shows operation of the control unit 5 for performing the protecting function for preventing use of an inapplicable consumable and setting the matching parameters when the consumable 3 or 4 is mounted on the main body 2.

When the consumable is mounted on the main body (step S1), the control unit 5 first determines whether the stencil printer is of a model in which matching parameters can be set (step S2). When it is determined that the stencil printer is not of a model in which matching parameters can be set, the control unit 5 reads the information on applicable models of printers stored in the memory means (step S3) and determines whether the mounted consumable is applicable to the printer. When it is determined that the consumable is applicable, the control unit 5 shifts to the normal operation and displays a message to the effect that a stencil master can be made (in the case of the roll master 4) or a print can be made. When it is determined in step S4 that the consumable is inapplicable to the printer, the control unit 5 stops the printer and displays a message to the effect that the mounted consumable is inapplicable to this printer and should be replaced with a correct consumable. (step S10)

On the other hand, when it is determined in step S2 that the stencil printer is of a model in which matching parameters can be set, the control unit 5 reads the parameter data of the consumable (step S6), and determines whether the consumable can be applied to the printer by adjustment of the functional parts of the main body (step S7). When it is determined that the consumable can be applied to the printer by adjustment of the functional parts, the control unit 5 optimizes setting of all the functional parts of the main body 2 in sequence on the basis of the parameters of the consumable. (steps S8 and S9)

When adjustment is completed for all the functional parts, the control unit shift to the normal operation (step S5). When it is determined in step S7 that the consumable cannot be applied to the printer by adjustment of the functional parts, the control unit 5 stops the printer (step S10).

By interchanging information between the main body 2 and the consumables 3 and 4 in the manner described above, the following functions can be obtained.

(1) Prevention of Use of an Inapplicable Consumable.

By recording information on applicable models of printers in the memory means of the consumable, and reading the information when the consumable is mounted on the main body 2, the control unit 5 can accurately judge whether the consumable mounted on the main body 2 is applicable to the main body 2. When it is determined that the mounted consumable is inapplicable to the main body 2, the control unit 5 does not operate the main body 2 and displays on the display panel 24 a message indicative that the consumable cannot be applied to the printer. In this manner, an inapplicable consumable can be surely prevented from being used, whereby failure of the printer due to use of an inapplicable consumable can be surely avoided.

(2) Setting of the Matching Parameters.

Matching parameters for matching the consumable with the main body 2 (operating conditions of the printer suitable for the consumable) are recorded in the memory means attached to the consumable and the control unit 5 reads the information when the consumable is mounted on the main body 2 and automatically sets the following functional parameters.

a) Information on the Sensitivity to Perforation of the Stencil Master Material.

The control unit 5 reads the information on the sensitivity to perforation of the stencil master material 41' and optimizes perforation energy of the TPH. Perforation of the stencil master material is controlled depending on heat (energy) generated by the TPH. That is, $$\text{quantity of heat } [j] = \text{power to resistance heater of TPH } [W] \times \text{time } [\text{sec}]$$

Accordingly, the control unit 5 sets power supply (can be converted to an electric voltage to be supplied) to the power control system and sets the perforating time to the TPH control system so that a stencil master can be made in a desired manner.

b) Information on the Thickness of the Stencil Master or the Stencil Master Material.

According to this information, the control unit 5 sets the value of the count representing the maximum number of stencil masters which can be received in the discharged master container. That is, the stencil master is removed from the printing drum 20 after printing and is stored in the discharged master container. The maximum number of stencil masters which can be stored in the discharged master container changes with the thickness of the stencil master and accordingly, the control unit 5 changes the value of the count at which the discharged master container is filled up.

Further, in order to detect the position of the stencil master, optical sensors are disposed along the path of the stencil master and the stencil master is conveyed under the control based on the detecting signals of the optical sensors. Since the reflectivity or the transmittance varies with the thickness of the stencil master, the control unit 5 sets optimal the sensitivity of the optical sensors according to the thickness of the stencil master. Specifically when the optical sensor comprises a light emitting element and a photodetector disposed on opposite sides of the stencil master and detects the stencil master according to whether the amount of light which is received by the photodetector is larger than a threshold value, the control unit 5 sets the threshold value larger when the stencil master is thin and smaller when the stencil master is thick. This increases detecting accuracy.

c) Information on the Viscosity of the Ink.

In the case of a stencil printer, the printing density depends upon the viscosity of ink. Accordingly, the printing pressure under which the press roller presses the printing paper against the ink roller through the stencil master has to be changed according to the viscosity of the ink. That is, the lower the viscosity of ink is (or the softer ink is), the lower the printing pressure is set and, the higher the viscosity of ink is (or the harder ink is), the higher the printing pressure is set.

d) Information on the Color of the Ink.

Since the density of ink varies according to the color of the ink, the printing pressure is optimized on the basis of the information on the color of the ink so that the printing density becomes constant irrespective of the color of the ink and the color of the ink is displayed on the panel or the like. At the same time, whether the color of the ink is applicable is judged when an ink cartridge is mounted on the main body and when it is determined that the color of the ink is applicable, the color of the ink is displayed whereas when it is determined that the color of the ink is not applicable, a message to the effect that this color is wrong is displayed, whereby use of wrong color ink can be prevented.

e) Information on the Dielectric Constant of the Ink.

In a stencil printer, ink supply is controlled on the basis of the amount of ink supplied detected by a sensor. Since the detecting sensitivity of the sensor is affected by the dielectric constant of the ink, the sensitivity of the sensor is optimized according to the dielectric constant of the ink. Specifically, the ink is supplied to an ink fountain by the ink feed pump and the amount of ink in the ink fountain is detected by an ink sensor. Then the ink feed pump is controlled so that the amount of ink in the ink fountain is kept constant. In the case where the ink sensor is of an electrostatic capacity detection type, the tip of a needle-like antenna connected to an oscillator is dipped in the ink and the ink level is detected on the basis of the output (frequency) of the oscillator which varies with the depth to which the antenna is dipped. The frequency of the output of the oscillator becomes lower as the depth to which the antenna is dipped increases and as the dielectric constant of the ink increases (as the electrostatic capacity about the antenna increases). Accordingly, the sensitivity of the ink sensor is calibrated on the basis of the information on the dielectric constant of the ink so that the amount of ink in the ink fountain can be accurately measured irrespective of the dielectric constant of the ink. That is, since the electrostatic capacity is in proportional to the product of the dielectric constant and the depth to which the antenna is dipped, the sensitivity of the ink sensor can be calibrated on the basis of the known dielectric constant of the ink.

f) Information on the Time for Which the Ink has Been Left at Rest.

When the ink has been left at rest for a long time, the ink dries and is not transferred to the printing paper immediately upon printing action. Accordingly, a preparatory action for introducing the ink into the ink fountain and feeding the ink to the inner surface of the printing drum, i.e., idling, is required. This idling action (idling time, the number of times by which the idling is carried out, and the like) must be adjusted according to the time for which the ink has been left at rest.

The time for which the ink has been left at rest can be measured by recording data of a timer function provided in the control unit of the main body in the memory means of the ink cartridge when the ink cartridge is removed from the main body (including the case where the ink cartridge is removed together with the printing drum), and calculating elapse of time from the time the ink cartridge is removed from the main body when the ink cartridge is mounted on the main body again.

g) Information on the Date of Production of the Consumable and the Like.

Service life of the consumable may be set and displayed on a panel or the like. When the consumable has been aged, desired performance cannot be ensured and the operator should be informed of the fact. For example, ink is deteriorated in its performance due to chemical change (separation) when a predetermined time elapses from production thereof. In the case of a stencil master material, for instance, the releasing agent evaporates and the stencil master material gets curled as time elapses, which can adversely affect conveyance of the stencil master material.

By automatic setting of the parameters described above, all the combinations of the consumables and the main bodies can be dealt with so long as the combination is within the range of adjustment of parameters, whereby the step of adjustment which differs from printer model to printer model can be eliminated and the cost can be reduced. Further, the consumables can be standardized for all the printer models and the productive facilities such as moldings can be standardized, whereby the management cost can be reduced. Further, the range of combinations of the consumable, the main body over which the performance of the printer can be guaranteed can be widened, variability of quality can be taken up and the yield can be improved. Further, specification change can be accepted to some extent without readjustment and supply of consumables for old models of printers for responsibility of keeping supply of consumables can be facilitated.

(3) Management of Remainder of the Consumable.

The total volume of the consumable (e.g., the total amount of ink in a new ink cartridge, the total length of the stencil master material of a new master roll, or the like) is recorded in the memory means attached to the consumable.

a) In the Case of the Master Roll.

The length of the stencil master material consumed for one stencil master for a given model of printer (will be referred to as "one stencil master length", hereinbelow) is constant and known, and the remainder length of the stencil master material is calculated each time a stencil master is made and recorded (updated) in the memory means of the master roll. For example, when a first stencil master is made, one stencil master length is subtracted from the total length of the stencil master material of the master roll, and then one stencil master length is subtracted from the remainder each time a stencil master is made. When the remainder becomes smaller than one stencil master length, a message that the master roll is to be replaced is displayed. The consumed length of the stencil master material may be subtracted each time a certain number of stencil masters are made.

b) In the Case of the Ink Cartridge.

Consumption of ink is subtracted from the total amount of ink in a new ink cartridge for each printing. Since consumption of ink varies depending on the printing number, the printing density, the proportion of the printed area and the like, a constant amount cannot be subtracted for each printing. Since the amount of ink in the ink fountain is detected by the ink sensor and the ink feed pump is controlled so that the amount of ink in the ink fountain is kept constant as described above, consumption of the ink can be known by detecting the operating time of the ink feed pump.

As can be understood from the description above, in the stencil printer of this embodiment, remainder of the consumable can be known without use of a sensor for detecting remainder of the consumable. Further, by displaying consumption or remainder of the consumable on a display panel or the like, the operator can use the printer without concern for exhaustion of the consumable.

Especially when the memory means comprises a nonvolatile memory (e.g., EEPROM, a flash memory or the like) and remainder of the consumable is recorded in the nonvolatile memory, the memory is held by the nonvolatile memory for a certain time, which is useful in management of remainder. For example, even if the consumable is once removed from the main body, the remainder of the consumable at the time the consumable is removed from the main body is held in the memory means. Accordingly, the control unit of the main body can continue management of remainder of the consumable on the basis of the remainder of the consumable stored in the memory means when the consumable is mounted on the main body again.

When it is expected that the remainder is too small to accomplish the operation intended by the operator, for instance, the following measures can be taken. For example, when the remainder of the stencil master material is only six stencil master lengths though 10 originals were set, the control unit informs the operator that the remainder of the stencil master material is too small to make the desired number of stencil masters. For example, when the printing number is set at 100 though the remainder of the ink is too small to make 100 prints, the control unit gives a message to the effect that the ink will be consumed in the course of printing. When a mode where stencil master making and printing are to be performed continuously, the control unit judges whether stencil masters and prints can be made in the desired number and informs the operator of the result of the judgment by display or the like. When the stencil printer of this embodiment is operated under the control of an external personal computer or the like, information on the remainder of the consumable may be transferred to the personal computer so that the personal computer can inform the operator of the information. By thus giving information to the operator, the printer will become more convenient.

Further, in accordance with the present invention, information in the form of electronic data can be exchanged between the main body and the consumable and accordingly various kinds of information can be stored in the memory means of the consumable.

(4) Protecting Functions.

Use of limited models of consumables is only accepted by collation of information on the consumable stored in the memory means of the consumable with data stored in the control unit of the main body and use of other models of consumables is prevented. When the information stored in the memory means of the consumable is coded, security is enhanced.

a) Protection Against Forgery or the Like.

As in prevention of use of an inapplicable consumable, information on the consumable stored in the memory means of the consumable mounted on the main body is collated with data stored in the control unit of the main body and the main body is operated only when the former conforms to the latter, thereby preventing use of forgeries or the like other than those specified by the service contracts or for guarantee of performance. Similarly, inter-model protection and inter-generational protection can be realized.

b) Protection by Type of Business.

In a type of business where the main body is leased without payment and amortization of the main body is recovered through the charge for consumables, charge to the customer naturally differs from that to customers who have purchased main bodies. Accordingly, if the customer under lease contract uses consumables provided for customers who have purchased main bodies, the business cannot hold. Such a situation can be avoided by recording the type of business in the memory means of the consumable. That is, use of consumables for customers who have purchased main bodies on the leased main body and use of consumables for customers under lease contract on the purchased main body are both prevented.

c) Protection by Locality.

Since prices of the consumables can differ, for instance, from country to country due to difference in customs and/or taxes, use of consumables in different country is prevented on the basis of information recorded in the memory means of the consumables.

d) Management of Recycling of Containers and the Like.

By recording how many times the container has been recycled in the memory means of the consumable, recycling of the containers can be managed. Since the memory means (electronic devices such as IC memories) can be reused up to the number of times by which the information can be rewritten in the memory means, the impact of the system of the present invention on the cost can be very small. For example, assuming hat information is rewritten about 300 times before one consumable is consumed up, the memory means can be removed from the container of the consumed consumable and attached to the container of a new consumable at least 300 times. By recording how many times the memory means has been recycled in the memory means itself, the recycling times of the memory means can be managed and recycling of the memory means more than a predetermined times can be prevented.

e) Protection Against Refill.

Recycling of a container whose memory means has not been rewritten with the record of remainder of the consumable is rejected. With this arrangement, refill by unauthorized persons can be prevented. Refill by any person may be rejected.

f) Setting and Resetting of the Protection Functions.

Since the aforesaid protection functions are based on collation of electronic data, each protection function can be easily set or reset. For example, when the condition of the main body varies, the conditions of protection can be changed by changing the data.

The data may be rewritten to set or reset the protection from the display panel or the like of the main body. By use of a password, security is enhanced.

Though, in the embodiment described above, the memory means on the consumable is connected to the control unit of the main body through an electrical contact (e.g., a serial three-wire system EEPROM), the memory means on the consumable may be of a type in which information is transferred between the memory means and the control unit through a non-contact connection. Such a non-contact type memory means includes those in which electronic data can be written and read by magnetic induction and those in which electronic data is communicated by microwave modulation. Specifically, a non-contact type IC card may be used. When a non-contact type memory means is employed, positioning of the memory means on the consumable may be relatively rough and generation of trouble due to contact failure caused by mechanical vibration or the like can be suppressed.

In addition, all of the contents of the Japanese patent application no. 11(1999)-193211 are incorporated into this specification by reference.

What is claimed is:

1. An image recording apparatus comprising a main body provided with a control unit and a replaceable consumable mounted on the main body forming a component of the image recording apparatus, comprising:

an information memory means in which electronic data representing information on the consumable is stored, the information memory means is mounted on the consumable, and the control unit of the main body is provided with a data transfer means operatively connected to the information memory means so as when the consumable is mounted on the main body the transfer of electronic data between the main body and the consumable is possible, wherein when it is determined that the consumable mounted on the main body is inapplicable as a result of collation, the control unit stops the image recording apparatus and informs the operator of the fact by a message.

2. An image recording apparatus comprising a main body provided with a control unit and a replaceable consumable mounted on the main body forming a component of the image recording apparatus, comprising:

an information memory means in which electronic data representing information on the consumable is stored, the information memory means is mounted on the consumable, and the control unit of the main body is provided with a data transfer means operatively connected to the information memory means so as when the consumable is mounted on the main body the transfer of electronic data between the main body and the consumable is possible, wherein the electronic data includes information on the date of production of the consumable while the control unit of the main body is provided with a timer function, and when it is determined, by comparison of the information on the date of production and the time given by the timer function, that the consumable mounted on the main body has aged longer than a predetermined period, the control unit stops the image recording apparatus and informs the operator of the fact by a message.

3. An image recording apparatus comprising a main body provided with a control unit and a replaceable consumable mounted on the main body forming a component of the image recording apparatus, comprising:

an information memory means in which electronic data representing information on the consumable is stored, the information memory means is mounted on the consumable, and the control unit of the main body is provided with a data transfer means operatively connected to the information memory means so as when the consumable is mounted on the main body the transfer of electronic data between the main body and the consumable is possible, wherein the control unit of the main body automatically controls adjusters of the main body on the basis of matching parameters representing conditions optimal to properties of the consumable represented by the electronic data, and wherein the matching parameters comprise sensitivity of a stencil master material, thickness of the stencil master material, viscosity of ink, dielectric constant of the ink, and time at which the ink has been left at rest.

4. An image recording apparatus comprising a main body provided with a control unit and a replaceable consumable mounted on the main body forming a component of the image recording apparatus, comprising:

an information memory means in which electronic data representing information on the consumable is stored, the information memory means is mounted on the consumable, and the control unit of the main body is provided with a data transfer means operatively connected to the information memory means so as when the consumable is mounted on the main body the transfer of electronic data between the main body and the consumable is possible, wherein the control unit does not operate the main body when remainder of the consumable as recorded in the information memory means is nullified.

5. An image recording apparatus comprising a main body provided with a control unit and a replaceable consumable mounted on the main body forming a component of the image recording apparatus, comprising:

an information memory means in which electronic data representing information on the consumable is stored, the information memory means is mounted on the consumable, and the control unit of the main body is provided with a data transfer means operatively connected to the information memory means so as when the consumable is mounted on the main body the transfer of electronic data between the main body and the consumable is possible, wherein protective information is recorded in the information memory means of the consumable and the control unit of the main body, the protective information in the information memory means and the protective information in the control unit are collated with each other when the consumable is mounted on the main body, and when the protective information in the information memory means and the protective information in the control unit conflict with each other, the control unit does not operate the main body, wherein the protective information recorded in the information memory means and the control unit comprises type of business and locality information.

6. An image recording apparatus as defined in claim 5 in which the control unit is provided with a setting means for setting and resetting the set protective information.

7. An image recording apparatus as defined in claim 5 in which the protective information recorded in the control unit can be rewritten so that the protective information can be changed.

8. An image recording apparatus as defined in claim 5 in which the protective information recorded in the information memory means can be reset through the data transfer means.

9. An image recording apparatus comprising a main body provided with a control unit and a replaceable consumable mounted on the main body forming a component of the image recording apparatus, comprising:

an information memory means in which electronic data representing information on the consumable is stored, the information memory means is mounted on the consumable, and the control unit of the main body is provided with a data transfer means operatively connected to the information memory means so as when the consumable is mounted on the main body the transfer of electronic data between the main body and the consumable is possible, wherein an electronic device including the information memory means is removably attached to the consumable and the electronic device is reused.

10. An image recording apparatus as defined in claim 9 in which the number of times by which the electronic device has been reused is recorded in the information memory means and the number of times by which the electronic device is reused is managed.

11. An image recording apparatus comprising a main body provided with a control unit and a plurality of replaceable consumable mounted on the main body forming a component of the image recording apparatus, comprising:

an information memory means in which electronic data representing information on the consumable is stored, the information memory means is mounted on the plurality of consumable, and the control unit of the main body is provided with a data transfer means operatively connected to the information memory means so as when the plurality of consumable are mounted on the main body the transfer of electronic data between the main body and the plurality of consumable is possible, wherein the control unit of the main body accesses the information memory means of the respective consumables in a time sharing system.

* * * * *